United States Patent Office 3,483,224
Patented Dec. 9, 1969

3,483,224
PREPARATION OF DEHYDROACETIC ACID
John T. Fitzpatrick, Charleston, and Willem R. van der Hoeven, South Charleston, W. Va., assignors to Union Carbide Corporation, a corporation of New York
No Drawing. Filed Mar. 15, 1966, Ser. No. 534,409
Int. Cl. C07d 7/06
U.S. Cl. 260—343.5        7 Claims

ABSTRACT OF THE DISCLOSURE

Azabicyclooctane catalysts are used to dimerize diketene to dehydroacetic acid.

---

The present invention relates to a novel process for the production of dehydroacetic acid by the dimerization of diketene.

The production of dehydroacetic acid by the catalytic dimerization of diketene is well known. Although it has been suggested to carry out the reaction in a continuous manner, no economically feasible, continuous process has been developed because of the need for a highly active catalyst which permits the use of inexpensive processing techniques and equipment to control the highly exothermic reaction. Most of the known catalysts are not sufficiently active to provide reaction rates justifying continuous operation. Other catalysts which do possess the requisite activity are unsatisfactory for other reasons such as their concurrent catalysis of side reactions, the requirement of high temperatures or high catalyst concentrations, or difficulties in handling the catalyst. Trimethylamine, for example, is capable of producing excellent reaction rates but it also leads to by-product formation which renders necessary the use of costly refining techniques such as codistillation of the product with methyl acetoacetate. Moreover, trimethylamine is unattractive as a catalyst for a commercial-scale, continuous operation because of the difficulties deriving from its high volatility.

We have now discovered a novel process for the continuous production of dehydroacetic acid which comprises continuously feeding diketene, a catalytic amount of an azabicyclooctane compound, and an anhydrous, inert, liquid, organic diluent into a reaction zone, and continuously removing dehydroacetic acid from said reaction zone. By operating in accordance with this process, we have found that high purity dehydroacetic acid is obtained in productivities which have heretofore been unobtainable.

By the term "azabicyclooctane" as used herein is meant 1-azabicyclo[2.2.2]octane, 1,4-diazabicyclo[2.2.2]octane, or a mono- or dialkyl derivative of either of these compounds. Illustrative of the azabicyclooctanes which are useful as catalyst in the present invention are 1-azabicyclo[2.2.2]-octane, 1,4-diazabicyclo[2.2.2]octane, 2-methyl- or ethyl-1,4-diazabicyclo[2.2.2]octane, 2,3-dimethyl-1,4-diazabicyclo[2.2.2]-octane, 2,3-diethyl-1-azabicyclo[2.2.2]octane, 2-(2-ethylhexyl)-1-azabicyclo[2.2.2]octane, 2,6-dioctyl-1,4-diazabicyclo[2.2.2]octane, and the like. The preferred catalysts are 1-azabicyclo[2.2.2]octane, 1,4-diazabicyclo[2.2.2]octane and the alkyl- and dialkyl-derivatives thereof wherein each alkyl group contains from 1 to 8 carbon atoms. The particularly preferred catalysts are 1,4- diazabicyclo[2.2.2]octane and 1-azabicyclo[2.2.2]octane.

The azabicyclooctane compound is used in a catalytically effective amount sufficient to convert the diketene to dehydroacetic acid. In general, the azabicyclooctane compound should be fed to the reaction zone at a rate which will maintain a concentration in the reaction zone of from about 0.01 to 0.2 percent by weight based on the total weight of the reaction mixture. Higher concentrations, for example, up to 1 percent by weight, can be used if desired, although little advantage is obtained by doing so. In addition to contaminating the product with catalyst per se, by-product formation may begin to occur to some extent when catalyst concentrations higher than the recommended range are used. On the other hand, concentrations which are lower than those of the recommended range may result in decreased reaction rates which diminish the efficiency of the process. Excellent reaction rates are obtained with substantially no by-product formation when using concentrations of from about 0.03 to about 0.1 percent by weight and such concentrations are thus preferred. To obtain reaction rates comparable to those obtained by using the azabicyclooctane catalysts, one would have to use up to ten times as much of the previously used tertiary amines such as triethylamine.

The anhydrous, inert, liquid, organic diluent can be any organic material which is liquid under the chosen reaction conditions, inert with respect to the reactants and products of the reaction and substantially free of water or other impurities which react with diketene. The diluent need not be a solvent for the diketene, dehydroacetic acid or the azabicyclooctane compound, it is preferred that the diluent be a solvent for the diketene and azabicyclooctane compounds and a nonsolvent for dehydroacetic acid. Suitable diluents include hydrocarbons such as heptane, cyclohexane, benzene, toluene, xylene, Tetralin, and the like; ketones such as acetone, methyl ethyl ketone, diethyl ketone, cyclohexanone, and the like; ethers such as diethyl ether, diisopropyl ether, and the like; esters such as ethyl acetate, butyl acetate, ethylene glycol monobutyl-ether acetate, and the like; and anhydrides such as acetic anhydride. It is, of course, permissible to use mixtures of such materials and the term "diluent" as used throughout the specification and claims is intended to encompass such mixtures. When the novel process is conducted under reduced pressure, as hereinafter described, it is preferred that the diluent be a volatile diluent, i.e. a diluent which will evaporate under the selected reaction conditions. In general, any otherwise suitable diluent having a vapor pressure of from about 30 to 600, preferably from 50 to 200, millimeters of mercury at the temperature of the reaction mixture will be a suitable volatile diluent.

The relative amounts of diketene and diluent fed to the reaction zone can vary widely depending upon such factors as the nature of the diluent itself, the chosen reaction temperature and the heat removal capacity of the equipment employed. In general, the same proportions of diketene to diluent which are suitable in conducting the batch processes of the prior art will also provide satisfactory results in the novel process of this invention. Good productivities and yields can be obtained by feeding to the reaction zone from about 0.5 to about 10.0, preferably from about 1.0 to 3.0, parts by weight of diketene per part by weight of diluent fed to the reaction zone. Higher proportions of diketene to diluent make temperature control increasingly difficult whereas lower proportions lead to progressively reduced productivities.

The azabicyclooctane compound, diketene and diluent are fed to the reactor in any suitable manner. It is usually convenient to dissolve or disperse the azabicyclooctane compound and the diketene in separate portions of the selected diluent and to introduce the resulting solutions or dispersions through separate ports to the reaction zone. The concentration of the azabicyclooctane compound or of the diketene in the respective feed streams has no bearing on the workability of the process and can vary according to the convenience of the operator in metering the appropriate proportions of ingredients to the reaction zone. The temperature of the feed streams is likewise not critical although controlling the temperature of the feed streams provides a convenient supplementary means for controlling the temperature in the reaction zone.

The residence time, i.e., the average amount of time that elapses between the introduction of diketene and its withdrawal as dehydroacetic acid from the reaction zone, is not narrowly critical. The optimum residence time is dependent upon such factors as the reaction temperature and the concentrations of the azabicyclooctane compound and diketene in the reaction zone. Residence times of from about 1 to 7 hours are generally satisfactory. Longer residence times can be employed although by-product formation may begin to occur. On the other hand, shorter residence times can also be used but reduced yields must be expected except at higher temperatures. Excellent productivities of high purity dehydroacetic acid are obtained by using residence times of from 2 to 4 hours even when the process is conducted on a commercial scale.

The reaction temperature is not narrowly critical. Temperatures of from about 10° C. to about 50° C. can be conveniently employed. Somewhat higher or lower temperatures can be used if desired, but at higher temperatures the likelihood of by-product formation is increased and at lower temperatures the productivity of the process suffers because reduced reaction rates are obtained. Excellent productivities of high purity dehydroacetic acid are obtained at temperatures in the range of from about 15° C. to about 35° C.

The reaction can be carried out under atmospheric pressure although we have found that particularly high productivities can be obtained when the process is carried out under reduced pressures. It is highly preferred that the reduced pressure be such as to cause the vaporization of sufficient diluent that the heat of vaporization of the diluent approximately equals the difference between the (1) heat of reaction and (2) the cooling capacity of the reactor and/or feed streams. Pressures of from 10 to 400 millimeters of mercury are satisfactory. While pressures of from 50 to 150 millimeters are generally preferred, the optimum pressure depends, of course, on the diluent that is used as well as the temperature that has been chosen for the reaction.

The reaction zone used for conducting the novel process is preferably of the tank or kettle type. The reactor is preferably so designed and/or equipped that there is a minimum concentration gradient of diketene in the reaction zone. The provision of a mechanical stirring mechanism which insures intimate contact between the diketene and azabicyclooctane compound in the reaction zone is highly desirable. High productivities are dependent upon a suitable means for removing the heat of reaction from the reaction zone and, consequently, an efficient means of temperature control should be provided. Reactors having external cooling jackets and/or internal cooling coils can be employed.

In a highly preferred embodiment of the present invention diketene, a catalytic amount of 1-azabicyclo[2.2.2]-octane or 1,4-diazabicyclo[2.2.2]octane as catalyst, and a volatile diluent, preferably a mixture of toluene and acetone, are continuously introduced into a reaction zone, maintaining a temperature of from 15 to 35° C. and a pressure of from 50 to 150 millimeters of mercury in said reaction zone, intimately contacting said catalyst with the diketene in said reaction zone for an average time of from 2 to 4 hours, continuously withdrawing part of the reaction mixture from said reaction zone and recovering dehydroacetic acid therefrom. By using a diluent mixture, i.e., mixture of 2 or more materials which would individually be suitable as diluents, the vapor pressure of the reaction mixture can be readily adjusted to provide the appropriate amount of vaporization of diluent to remove the heat of reaction. The diluent vapors can be continually removed from the reaction zone via a vapor line, liquified in a condenser and, if desired, returned to the reaction zone. Of course, conventional heat exchange techniques based on contacting the reaction mixture with a cooling surface can be used in addition to the vapor cooling.

The portion of the reaction mixture which is continuously withdrawn as the product stream is usually a slurry and the methods by which the dehydroacetic acid can be recovered from the product stream are well known in the art. The product stream is preferably cooled to about 0° C. The dehydroacetic acid can then be conveniently collected by filtration, washed with fresh inert diluent and dried. It is an outstanding feature of this invention that the dehydroacetic acid so obtained is of acceptable commercial purity without employing the further expensive purification procedures which characterized the prior art processes. Dehydroacetic acid which is cream-white in color and which melts at from 108° C. to 110° C. can now be continuously obtained without subsequent purification techniques such as codistillation with acetoacetic esters.

The following examples serve to illustrate the invention. Parts by weight bear the same relationship to parts by volume as a kilogram does a liter.

EXAMPLE I

A tank-type reactor equipped with a mechanical stirrer and a cooling jacket was charged with a solution of 0.24 part by weight 1,4-diazabicyclo[2.2.2]octane in 200 parts by volume of toluene and 30 parts by volume of acetone. A diketene solution containing 55 weight percent diketene, 12.3 weight percent acetone and 32.7 weight percent toluene was prepared and 250 parts by weight thereof were continuously stirred into the reaction mixture in 107 minutes during which time the temperature of the reaction mixture was held between 17° C. and 22° C. Addition of the diketene solution was then interrupted, although stirring of the mixture continued, for 15 minutes. A catalyst solution containing 0.87 part by weight of 1,4-diazabicyclo[2.2.2]octane and 600 parts by volume of toluene was then continuously fed to the reactor at a rate of 60 parts by volume per hour, the addition of the diketene solution was resumed at a rate of 122.4 parts by weight per hour, and the liquid level in the reactor was held constant by continuous withdrawal of dehydroacetic acid slurry from the bottom of the reactor. This procedure, which gave an average residence time of 2.7 hours, was continued for 10 hours while maintaining the reaction mixture at atmospheric pressure and a temperature between 21° C. and 26° C. by circulating cold water through the cooling jacket of the reactor. The dehydroacetic acid slurry was cooled to 10° C., collected by filtration, and washed with fresh toluene to provide a 60 percent yield of a cream-white, 98.5 percent pure dehydroacetic acid having a melting point of 108–110° C.

EXAMPLE II

This example was conducted in a manner similar to Example I except that the feed rates of the catalyst solution and the diketene solution and the rate at which the dehydroacetic acid slurry was withdrawn were adjusted to give an average residence time of 2.2 hours. A 58 percent yield of dehydroacetic acid having a purity of 98.5 percent was obtained.

In like manner diketene is dimerized by using as the catalyst 1-azabicyclo[2.2.2]octane, 2-ethyl-1,4-diazabicyclo[2.2.2]octane or 2,3-dimethyl-1,4-diazabicyclo[2.2.2]octane to obtain comparable yields and productivities of high purity dehydroacetic acid.

EXAMPLE III

This example was conducted in a manner similar to Example I except that the feed rates of the catalyst solution and the diketene solution and the rate at which the dehydroacetic acid slurry was withdrawn were adjusted to give an average residence time of 3.2 hours. A 63 percent yield of dehydroacetic acid having a purity of 98.5 percent was obtained.

EXAMPLE IV

A tank-type reactor having a vapor line to a condenser, a return line from the condenser, and equipped with a cooling jacket and mechanical stirrer was charged with a solution of 0.8 part by weight of 1,4-diazabicyclo[2.2.2]octane in 760 parts by volume of toluene and 110 parts by volume of acetone. Stirring of the mixture was begun and 130 parts by volume of a diketene solution containing 70 weight percent diketene and 30 weight percent acetone were added over a period of 120 minutes while maintaining the temperature of the reaction mixture between 18° C. and 25° C. Thereafter, 0.1 part by weight of dehydroacetic acid per part by volume of total reaction mixture per hour was continuously withdrawn as a slurry from the reactor and the temperature of the reaction mixture was maintained between 18° C. and 25° C. solely by refluxing the acetone-toluene mixture at reduced pressures of from 70 to 150 millimeters of mercury. Diketene was continuously fed to the reactor at a rate of 0.168 part by weight per part by volume of total reaction mixture per hour and 1,4-diazabicyclo[2.2.2]octane was fed at a rate such that its concentration in the reaction mixture was 0.07 weight percent. Acetone and toluene were continuously added at a rate that maintained a constant reaction mixture volume. The average residence time was 3 hours. The dehydroacetic acid was collected from the product slurry by filtration, washed with toluene and dried. The dehydroacetic acid so obtained was equivalent in quality to that obtained according to Example I.

What is claimed is:

1. A process for the continuous production of dehydroacetic acid which comprises continuously feeding a reaction mixture of diketene, an azabicyclooctane compound, and an anhydrous, inert, liquid, organic diluent into a reaction zone, where said azabicyclooctane compound is employed in amounts up to one percent by weight based on said reaction mixture and is selected from the group consisting of 1,4-diazabicyclo[2.2.2]octane, 1-azabicyclo[2.2.2]octane and the monoalkyl and dialkyl derivatives thereof wherein each alkyl group contains from 1 to 8 carbon atoms, reacting said diketene at a reaction temperature of from 10° to 50° C., and continuously removing dehydroacetic acid.

2. A process as claimed in claim 1 which comprises continuously feeding said diketene, a catalytically effective amount of said azabicyclooctane compound, and a volatile, anhydrous, inert, liquid, organic diluent into a reaction zone, contacting said diketene with said azabicyclooctane compound in said reaction zone at a temperature of from 10° C. to 50° C. and a reaction pressure of from 10 to 400 millimeters of mercury, continuously withdrawing part of the reaction mixture from said reaction zone and recovering dehydroacetic acid therefrom.

3. A process as claimed in claim 2 in which the azabicyclooctane compound is 1-azabicyclo[2.2.2]octane.

4. A process as claimed in claim 2 in which the azabicyclooctane compound is 1,4-diazabicyclo[2.2.2]octane.

5. A process as claimed in claim 2 in which the reaction pressure is from 50 to 150 millimeters of mercury.

6. A process as claimed in claim 2 in which the vapor pressure of the diluent at the reaction temperature is from 50 to 200 millimeters of mercury.

7. A process as claimed in claim 2 which comprises continuously feeding diketene, a catalytically effective amount of 1,4-diazabicyclo[2.2.2]octane, toluene and acetone into a reaction zone, contacting said diketene with said 1,4-diazabicyclo[2.2.2]octane in said reaction zone at a temperature of from 15° C. to 35° C. and a pressure of from 50 to 150 millimeters of mercury, continuously withdrawing a slurry of dehydroacetic acid from said reaction zone and recovering dehydroacetic acid therefrom.

References Cited

UNITED STATES PATENTS

| 2,229,204 | 1/1941 | Boese | 260—343.5 |
| 2,849,456 | 8/1958 | Branch | 260—343.5 |

OTHER REFERENCES

Farkas et al., Chem. Abstracts 54, 14,258h as abstracted from J. Am. Chem. Soc. 82, 642 (1960).

Britain et al., Chem. Abstracts, 55, 9010f as abstracted from J. Appl. Polymer Sci. 4, 207 (1960).

Lemieux et al., Chemical Abstracts 62, 7849h as abstracted from Can. J. Chem. 43(l), 94 (1965).

ALEX MAZEL, Primary Examiner

J. A. NARCAVAGE, Assistant Examiner

U.S. Cl. X.R.

252—426, 438